(12) United States Patent
Tang et al.

(10) Patent No.: US 9,790,094 B2
(45) Date of Patent: Oct. 17, 2017

(54) POROUS GRAPHENE PREPARATION METHOD

(71) Applicant: Jinan Shengquan Group Share Holding Co., Ltd., Ji'nan (CN)

(72) Inventors: Yilin Tang, Ji'nan (CN); Jinzhu Zhang, Ji'nan (CN); Yingfu Zheng, Ji'nan (CN); Xiaomin Liu, Ji'nan (CN); Ding Liu, Ji'nan (CN); Enhua Wang, Ji'nan (CN)

(73) Assignee: Jinan Shengquan Group Share Holding Co., Ltd., Zhangqiu (CN)

( * ) Notice: Subject to any disclaimer, the term of this patent is extended or adjusted under 35 U.S.C. 154(b) by 0 days.

(21) Appl. No.: 15/322,043

(22) PCT Filed: Jul. 1, 2015

(86) PCT No.: PCT/CN2015/083029
§ 371 (c)(1),
(2) Date: Dec. 23, 2016

(87) PCT Pub. No.: WO2016/000614
PCT Pub. Date: Jan. 7, 2016

(65) Prior Publication Data
US 2017/0137293 A1    May 18, 2017

(30) Foreign Application Priority Data

Jul. 1, 2014    (CN) .......................... 2014 1 0308860

(51) Int. Cl.
  *C01B 31/04*    (2006.01)
(52) U.S. Cl.
  CPC ................................ *C01B 31/0446* (2013.01)
(58) Field of Classification Search
  CPC . C01B 31/04; C01B 31/0407; C01B 31/0415; C01B 31/0423; C01B 31/043; C01B 31/0438; C01B 31/0446; C01B 31/0453; C01B 31/0461; C01B 31/0469; C01B 31/0476; C01B 31/0484; C01B 31/0492; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

USPC ......................................................... 423/448
See application file for complete search history.

(56) References Cited

U.S. PATENT DOCUMENTS

2015/0307356 A1* 10/2015 Zhang ................. C01B 31/0446
                                                      423/448

FOREIGN PATENT DOCUMENTS

| CN | 101736646 | 6/2010 |
|---|---|---|
| CN | 103449399 | 12/2013 |
| CN | 103466613 | 12/2013 |
| CN | 103641111 | 3/2014 |
| CN | 104016341 | 9/2014 |

OTHER PUBLICATIONS

International Search Report for International Application PCT/CN2015/083029, dated Oct. 10, 2015.
First Office Action from corresponding Chinese application CN 201410308860.1, dated Jun. 3, 2015.
Second Office Action from corresponding Chinese application CN 201410308860.1, dated Feb. 15, 2016.
Third Office Action from corresponding Chinese application CN 201410308860.1, dated Jun. 15, 2016.

* cited by examiner

*Primary Examiner* — Daniel C McCracken
(74) *Attorney, Agent, or Firm* — Lathrop & Gage LLP

(57) ABSTRACT

Provided is a porous graphene preparation method, comprising: under the function of a catalyst, conducting catalytic treatment on a biomass carbon source to obtain a first intermediate product, the catalyst comprising one or more of chlorides of manganese, iron compounds, cobalt compounds and nickel compounds; under protective gas condition, heating the first intermediate product from a first temperature to a second temperature and holding to obtain a second intermediate product; heating the second intermediate product from the second temperature to a third temperature and holding to obtain a third intermediate product; heating the third intermediate product from the third temperature to a fourth temperature and holding to obtain a fourth intermediate product; and cooling the fourth intermediate product from the fourth temperature to a fifth temperature and holding to obtain porous graphene. The porous graphene prepared via the method of the present invention has better electrical conductivity.

25 Claims, 3 Drawing Sheets

POROUS GRAPHENE PREPARATION METHOD

CROSS-REFERENCE TO RELATED APPLICATIONS

This application is a U.S. National Stage Application filed under 35 U.S.C. §371 of International Application No. PCT/CN2015/083029, filed Jul. 1, 2015, which claims the benefit of Chinese Application No. CN 201410308860, filed Jul. 1, 2014. Both of these applications are hereby incorporated by reference in their entireties.

TECHNICAL FIELD

The present invention relates to the technical field of graphene, and particularly to a method for preparing porous graphene.

BACKGROUND ART

Graphene is a material of a single-layered lamellar structure composed of carbon atoms. The graphene is almost completely transparent, and only absorbs 2.3% of light; a coefficient of thermal conductivity of the graphene is up to 5,300 W/m·K, which is higher than those of a carbon nanotube and diamond; an electronic mobility of the graphene at room temperature exceeds 15,000 $cm^2/V·s$, which is higher than those of a carbon nanotube or a silicon crystal; an electrical resistivity of the graphene is only $10^{-8}$ $\Omega·m$, which is lower than that of copper or silver, that is, the graphene is a material having the smallest electrical resistivity in the world. Due to advantages such as good transparency, small electrical resistivity and fast electron migration rate and the like, the graphene can be used to manufacture transparent touch screens, light panels and solar cells.

Currently, methods for preparing graphene mainly include a mechanical exfoliation method, a chemical vapor deposition method, a pyrolysis epitaxial growth method and so on, wherein the chemical vapor deposition method is simple and easy to prepare the graphene, and can provide large-area graphene with a high quality. For example, a Chinese patent application no. 200810113596.0 discloses a method for preparing graphene by a chemical vapor deposition method, specifically, the method is performed as follows: a substrate provided with catalyst is placed into an oxygen-free reactor to make a temperature of the substrate reach between 500° C.~1,200° C.; then, carbonaceous matters are added into the reactor, and the graphene is obtained, where the catalyst is a metal or an metallic compound, and the carbonaceous matters are one or more selected from methane, acetylene, ethanol, benzene, toluene and cyclohexane. This process for preparing the graphene provided in the prior art is simple and convenient to operate, and can be used for mass production; moreover, the graphene prepared with this process has relatively good quality. However, the graphene prepared in the prior art has a relatively poor electrical conductivity.

Disclosure of the Invention

In view of this, an object of the present invention is to provide a method for preparing porous graphene, and the porous graphene prepared through the method provided in the present invention has a relatively good electrical conductivity.

The present invention provides a method for preparing porous graphene, where the method comprises the following steps:
1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds;
2) under a condition of a protective gas, heating the first intermediate product from a first temperature to a second temperature, and keeping the second temperature to obtain a second intermediate product, the first temperature being 20° C.~40° C., and the second temperature being 300° C.~400° C.;
3) under a condition of a protective gas, heating the second intermediate product from the second temperature to a third temperature, and keeping the third temperature to obtain a third intermediate product, the third temperature being 800° C.~900° C.;
4) under a condition of a protective gas, heating the third intermediate product from the third temperature to a fourth temperature, and keeping the fourth temperature to obtain a fourth intermediate product, the fourth temperature being 1,100° C.~1,300° C.; and
5) under a condition of a protective gas, cooling the fourth intermediate product from the fourth temperature to a fifth temperature, and keeping the fifth temperature to obtain the porous graphene, the fifth temperature being 900° C.~1,000° C.

Preferably, the biomass carbon source in the step 1) is one or two selected from the group consisting of cellulose and lignin.

Preferably, the biomass carbon source in the step 1) is cellulose.

Preferably, the cellulose is porous cellulose.

Preferably, the porous cellulose is prepared by a method comprising steps as follows:
A) hydrolyzing a biomass resource in an acid, to obtain lignocellulose, the biomass resource comprising one or more selected from the group consisting of plants and agricultural and forestry residues; and
B) conducting treatment on the lignocellulose, to obtain the porous cellulose, the treatment comprising acid treatment, salt treatment or organic solvent treatment.

Preferably, the biomass resource in the step A) is the agricultural and forestry residue.

Preferably, the agricultural and forestry residue comprises one or more selected from the group consisting of corn stalk, corncob, sorghum stalk, beet pulp, bagasse, furfural residue, corncob residue, wood chip, cotton stalk and reed.

Preferably, the agricultural and forestry residue is corncob.

Preferably, the acid in the step A) comprises one or more selected from the group consisting of sulfuric acid, nitric acid, hydrochloric acid, formic acid, sulfurous acid, phosphoric acid and acetic acid.

Preferably, the dosage of the acid in the step A) is 3 wt %~20 wt % of the biomass resource.

Preferably, the hydrolyzing in the step A) is conducted at a temperature of 90° C.~180° C.; and
the hydrolyzing in the step A) lasts for 10 min~10 h.

Preferably, the salt treatment in the step B) is acidic sulfite treatment or alkaline sulfite treatment.

Preferably, a pH value in a process of the acidic sulfite treatment is 1~7;

the dosage of an acid in the process of the acidic sulfite treatment is 4 wt %~30 wt % of the lignocellulose; and a percentage by weight of the acid in the acidic sulfite treatment causes a liquid-to-solid ratio of (2~20):1.

Preferably, the acidic sulfite treatment is conducted at a temperature of 70° C.~180° C.; and the acidic sulfite treatment lasts for 1 hour to 6 hours.

Preferably, a pH value in a process of the alkaline sulfite treatment is 7~14;

the dosage of a base in the process of the alkaline sulfite treatment is 4 wt %~30 wt % of the lignocellulose; and a percentage by weight of the base in the alkaline sulfite treatment causes a liquid-to-solid ratio of (2~20):1.

Preferably, the alkaline sulfite treatment is conducted at a temperature of 70° C.~180° C.; and the alkaline sulfite treatment lasts for 1 hour to 6 hours.

Preferably, after the porous cellulose is obtained, step B) further comprises:

conducting bleaching treatment on the porous cellulose.

Preferably, a mass ratio of the catalyst to the biomass carbon source in the step 1) is (0.01~2):1.

Preferably, the iron compounds in the step 1) comprise one or more selected from the group consisting of chlorides of iron, cyanides of iron and salts of iron-containing acids;

the cobalt compounds in the step 1) comprise one or more selected from the group consisting of chlorides of cobalt and salts of cobalt-containing acids; and the nickel compounds in the step 1) comprise one or more selected from the group consisting of chlorides of nickel and salts of nickel-containing acids.

Preferably, the catalyst in the step 1) comprises one or more selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

Preferably, the protective gas in the step 2), the protective gas in the step 3), the protective gas in the step 4) and the protective gas in the step 5) are independently one or more selected from the group consisting of nitrogen gas and inert gases.

Preferably, heating the first intermediate product from the first temperature to the second temperature in the step 2) is conducted at a heating rate of 5° C./min~20° C./min.

Preferably, heating the second intermediate product from the second temperature to the third temperature in the step 3) is conducted at a heating rate of 30° C./min~40° C./min.

Preferably, heating the third intermediate product from the third temperature to the fourth temperature in the step 4) is conducted at a heating rate of 50° C./min~60° C./min.

Preferably, cooling the fourth intermediate product from the fourth temperature to the fifth temperature in the step 5) is conducted at a cooling rate of 30° C./min~50° C./min.

The present invention provides a method for preparing porous graphene, where the method comprises the following steps: 1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds; 2) under the condition of a protective gas, heating the first intermediate product from a first temperature to a second temperature, and keeping the second temperature to obtain a second intermediate product, the first temperature being 20° C.~40° C., and the second temperature being 300° C.~400° C.; 3) under the condition of a protective gas, heating the second intermediate product from the second temperature to a third temperature, and keeping the third temperature to obtain a third intermediate product, the third temperature being 800° C.~900° C.; 4) under the condition of a protective gas, heating the third intermediate product from the third temperature to a fourth temperature, and keeping the fourth temperature to obtain a fourth intermediate product, the fourth temperature being 1,100° C.~1,300° C.; and 5) under the condition of a protective gas, cooling the fourth intermediate product from the fourth temperature to a fifth temperature, and keeping the fifth temperature to obtain the porous graphene, the fifth temperature being 900° C.~1,000° C. The porous graphene prepared with the method provided in the present invention has a relatively good electrical conductivity. Experiment results showed that the electrical conductivity of the porous graphene prepared with the method provided in the present invention can be up to 40,000 S/m.

Besides, the porous graphene prepared with the method provided in the present invention has a thin lamellar structure and a high level of Sp2 hybridization; moreover, the method for preparing porous graphene provided in the present invention has a simple process, low energy consumption and low cost.

BRIEF DESCRIPTION OF DRAWINGS

In order to more clearly illustrate technical solutions of examples of the present invention or the prior art, figures which are needed for description of the examples or the prior art will be introduced briefly below. Obviously, the figures in the following description merely show the examples of the present invention, and a person ordinarily skilled in the art still can obtain other figures based on the figures provided, without paying inventive efforts.

DETAILED DESCRIPTION OF EMBODIMENTS

Figure 1:
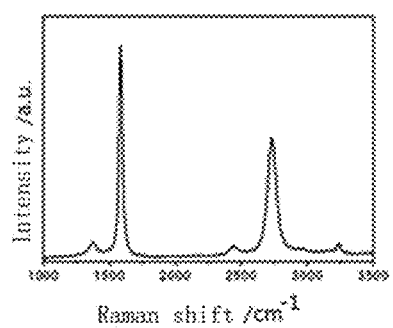
FIG. 1 shows Raman spectrum of graphene obtained in Example 6 of the present invention.
Figure 2:
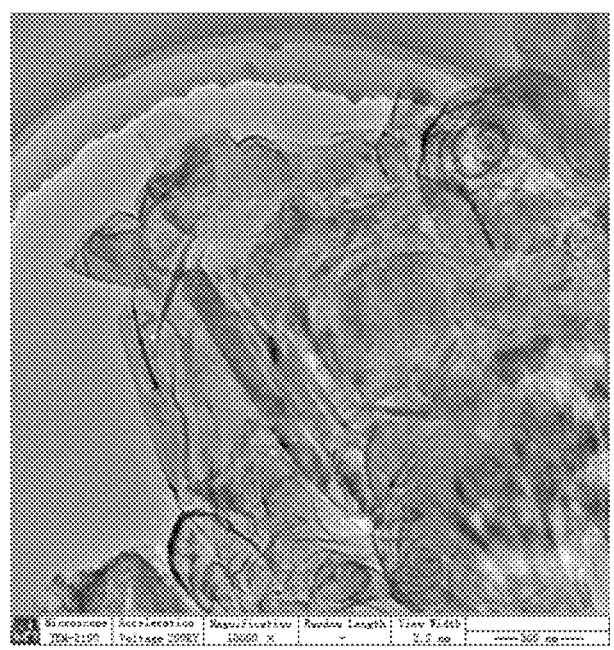
FIG. 2 shows a transmission electron microscope picture of the graphene obtained in Example 6 of the present invention.
Figure 3:
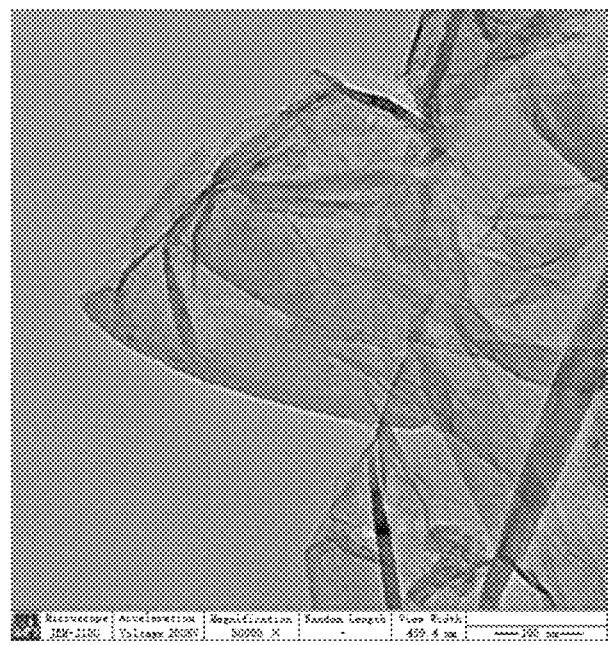
FIG. 3 shows a transmission electron microscope picture of the graphene obtained in Example 6 of the present invention.
Figure 4:
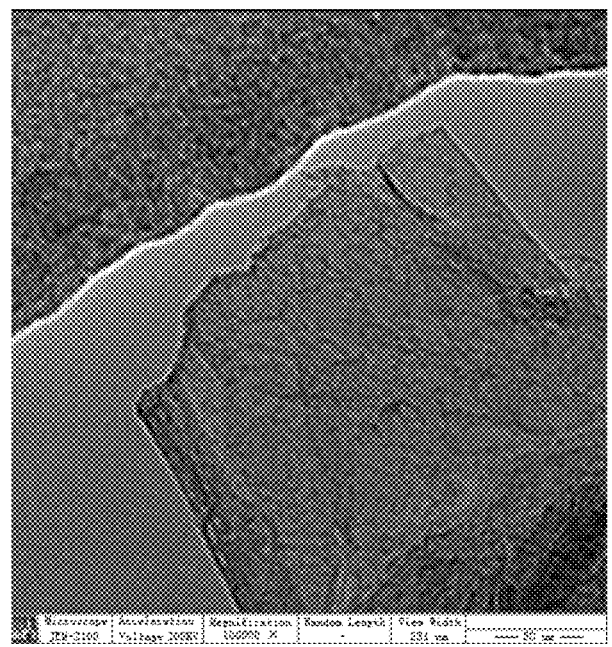
FIG. 4 shows a transmission electron microscope picture of the graphene obtained in Example 6 of the present invention.
Figure 5:
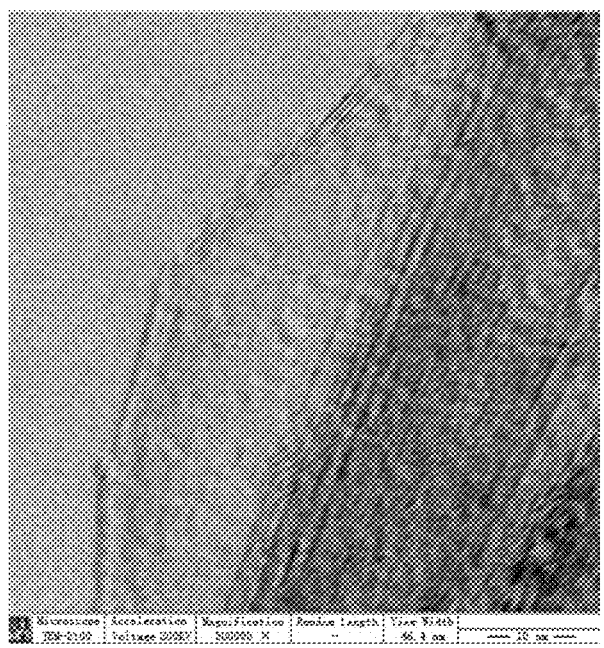
FIG. 5 shows a transmission electron microscope picture of the graphene obtained in Example 6 of the present invention.

Technical solutions in examples of the present invention will be described clearly and completely below. Apparently, the described examples are merely some but not all examples of the present invention. Based on the examples of the present invention, all the other examples obtained by a person ordinarily skilled in the art, without paying inventive efforts, should fall within the scope of protection of the present invention.

The present invention provides a method for preparing porous graphene, where the method comprises the following steps:

1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds;

2) under the condition of a protective gas, heating the first intermediate product from a first temperature to a second temperature, and keeping the second temperature to obtain a second intermediate product, the first temperature being 20° C.~40° C., and the second temperature being 300° C.~400° C.;

3) under the condition of a protective gas, heating the second intermediate product from the second temperature to a third temperature, and keeping the third temperature to obtain a third intermediate product, the third temperature being 800° C.~900° C.;

4) under the condition of a protective gas, heating the third intermediate product from the third temperature to a fourth temperature, and keeping the fourth temperature to obtain a fourth intermediate product, the fourth temperature being 1,100° C.~1,300° C.; and 5) under the condition of a protective gas, cooling the fourth intermediate product from the fourth temperature to a fifth temperature, and keeping the fifth temperature to obtain the porous graphene, the fifth temperature being 900° C.~1,000° C.

The porous graphene prepared with the method provided in the present invention has a relatively good electrical conductivity. Besides, the porous graphene prepared with the method provided in the present invention has a thin lamellar structure and a high level of Sp2 hybridization; moreover, the method for preparing porous graphene provided in the present invention has a simple process, low energy consumption and low cost.

In the present invention, the catalytic treatment is conducted on the biomass carbon source in the presence of the catalyst, to obtain the first intermediate product, the catalyst comprising one or more selected from the group consisting of a chlorinated salt of manganese, iron compounds, cobalt compounds and nickel compounds. In the present invention, it is preferable to mix the catalyst and the biomass carbon source, to obtain the first intermediate product. Methods for the mixing are not specially limited in the present invention, and any mixing technical solution well known to a person skilled in the art can be adopted as long as the catalyst and the biomass carbon source can be stirred uniformly. In the present invention, the mixing is preferably conducted at a temperature of 20° C.~180° C., more preferably 50° C.~150° C., and most preferably 80° C.~120° C. In the present invention, the mixing preferably lasts for 2 hours to 10 hours, and more preferably 5 hours to 7 hours.

In the present invention, the catalyst comprises one or more selected from the group consisting of chlorides of manganese, iron compounds, cobalt compounds and nickel compounds, and preferably one of chlorides of manganese, iron compounds, cobalt compounds and nickel compounds. In the present invention, the chloride of manganese is preferably manganese chloride. In the present invention, the iron compounds preferably comprise one or more selected from the group consisting of chlorides of iron, cyanides of iron and salts of iron-containing acids, and more preferably one or more of ferric chloride, ferrous chloride, ferric nitrate, ferrous nitrate, ferric sulfate, ferrous sulfate, potassium ferricyanide, potassium ferrocyanide and potassium trioxalatoferrate. In the present invention, the cobalt compounds comprise one or more selected from the group consisting of chlorides of cobalt and salts of cobalt-containing acids, and more preferably one or more of cobalt chloride, cobalt nitrate, cobalt sulfate and cobalt acetate. In the present invention, the nickel compounds preferably comprise one or more selected from the group consisting of chlorides of nickel and salts of nickel-containing acids, and more preferably one or more of nickel chloride, nickel nitrate, nickel sulfate and nickel acetate. In the present invention, the catalyst is preferably one or more selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate. Sources of the catalyst are not specially limited in the present invention, the above-mentioned types of catalysts well-known to a person skilled in the art can be used, and they are available from the market.

In the present invention, the biomass carbon source is preferably one or two selected from the group consisting of cellulose and lignin, more preferably cellulose and most preferably porous cellulose. In the present invention, a method for preparing the porous cellulose preferably comprises the following steps:

A) hydrolyzing a biomass resource in an acid, to obtain lignocellulose, the biomass resource comprising one or more selected from the group consisting of plants and agricultural and forestry residues; and B) conducting treatment on the lignocellulose, to obtain the porous cellulose, the treatment comprising acid treatment, salt treatment or organic solvent treatment.

In the present invention, it is preferable to hydrolyze the biomass resource in an acid, to obtain lignocellulose, the biomass resource comprising one or more selected from the group consisting of plants and agricultural and forestry residues. In the present invention, the hydrolyzing is preferably conducted at a temperature of 90° C.~180° C., and more preferably 120° C.~150° C. In the present invention, the hydrolyzing preferably lasts for 10 min~10 h, more preferably 1 h~8 h, and most preferably 3 h~6 h.

In the present invention, the acid in the hydrolyzing is preferably one or more selected from the group consisting of sulfuric acid, nitric acid, hydrochloric acid, formic acid, sulfurous acid, phosphoric acid and acetic acid, more preferably sulfuric acid, nitric acid, hydrochloric acid, phosphoric acid or acetic acid, and most preferably sulfuric acid, nitric acid or hydrochloric acid. In the present invention, the dosage of the acid in the hydrolyzing is preferably 3 wt %~20 wt %, more preferably 5 wt %~15 wt %, and most preferably 8 wt %~12 wt % of the biomass resource.

In the present invention, the biomass resource is preferably the agricultural and forestry residue, more preferably one or more selected from the group consisting of corn stalk, corncob, sorghum stalk, beet pulp, bagasse, furfural residue, corncob residue, wood chip, cotton stalk and reed, and most preferably corncob.

After the lignocellulose is obtained, it is preferable in the present invention to conduct treatment on the lignocellulose, to obtain the porous cellulose, and the treatment comprises acid treatment, salt treatment or organic solvent treatment. In the present invention, it is more preferable to conduct salt treatment on the lignocellulose, to obtain the porous cellulose. In the present invention, the salt treatment is preferably acidic sulfite treatment or alkaline sulfite treatment. In the present invention, a pH value in a process of the acidic sulfite treatment is preferably 1~7, more preferably 2~5, and most preferably 3~4. In the present invention, the acidic sulfite treatment is preferably conducted at a temperature of 70° C.~180° C., more preferably 90° C.~150° C., and most preferably 100° C.~120° C. In the present invention, the acidic sulfite treatment preferably lasts for 1 hour to 6 hours, more preferably 2 hours to 5 hours, and most preferably 3 hours to 4 hours.

In the present invention, the acid in the acidic sulfite treatment is preferably sulfuric acid. In the present invention, the dosage of the acid in the process of the acidic sulfite treatment is preferably 4 wt %~30 wt %, more preferably 8 wt %~25 wt %, and most preferably 10 wt %~20 wt % of the lignocellulose. In the present invention, a percentage by weight of the acid in the acidic sulfite treatment preferably causes a liquid-to-solid ratio of (2~20):1, more preferably (4~16):1, and most preferably (8~12):1.

In the present invention, the sulfite in the acidic sulfite treatment is preferably calcium sulfite, magnesium sulfite, sodium sulfite or ammonium sulfite, and more preferably magnesium sulfite or sodium sulfite. The dosage of the sulfite in the process of the acidic sulfite treatment is not specially limited in the present invention, and a dosage of the sulfite in the sulfite pulping process well-known to a person skilled in the art can be used.

In the present invention, a pH value in a process of the alkaline sulfite treatment is preferably 7~14, more preferably 8~13, and most preferably 9~12. In the present invention, the alkaline sulfite treatment is preferably conducted at a temperature of 70° C.~180° C., more preferably 90° C.~150° C., and most preferably 100° C.~120° C. In the present invention, the alkaline sulfite treatment preferably lasts for 1 hour to 6 hours, more preferably 2 hours to 5 hours, and most preferably 3 hours to 4 hours.

In the present invention, a base in the alkaline sulfite treatment is preferably calcium hydroxide, sodium hydroxide, ammonium hydroxide or magnesium hydroxide, and more preferably sodium hydroxide or magnesium hydroxide. In the present invention, the dosage of the base in the process of the alkaline sulfite treatment is preferably 4 wt %~30 wt %, more preferably 8 wt %~25 wt %, and most preferably 10 wt %~20 wt % of the lignocellulose. In the present invention, a percentage by weight of the base in the alkaline sulfite treatment preferably causes a liquid-to-solid ratio of (2~20):1, more preferably (4~16):1, and most preferably (8~12):1.

In the present invention, the sulfite in the alkaline sulfite treatment is preferably calcium sulfite, magnesium sulfite, sodium sulfite or ammonium sulfite, and more preferably magnesium sulfite or sodium sulfite. The dosage of the sulfite in the process of the alkaline sulfite treatment is not specially limited in the present invention, and a dosage of the sulfite in the sulfite pulping process well-known to a person skilled in the art can be used.

After the porous cellulose is obtained, the present invention preferably further comprises:

conducting bleaching treatment on the porous cellulose.

Methods for the bleaching treatment are not specially limited in the present invention, and a bleaching technical solution well-known to a person skilled in the art can be used. In the present invention, the bleaching method is preferably total-chlorine-free bleaching, and more preferably hydrogen peroxide bleaching. A concentration of hydrogen peroxide is not specially limited in the present invention, and the hydrogen peroxide of a commonly used concentration can be used. In the present invention, a mass of the hydrogen peroxide is preferably 1%~10% and more preferably 2%~8% of a mass of the porous cellulose. In the present invention, a bleaching temperature for the hydrogen peroxide bleaching is preferably 60° C.~130° C., and more preferably 80° C.~100° C.; and bleaching time for the hydrogen peroxide bleaching is preferably 1 h~10 h, and more preferably 2 h~8 h.

In the present invention, a mass ratio of the catalyst to the biomass carbon source is preferably (0.01~2):1, more preferably (0.1~1):1, and most preferably (0.3~0.8):1. In the present invention, the catalytic treatment is preferably conducted at a temperature of 20° C.~180° C., more preferably 50° C.~150° C., and most preferably 80° C.~120° C. In the present invention, the catalytic treatment preferably lasts for 2 hours to 10 hours, and more preferably 5 hours to 7 hours.

After the catalytic treatment is conducted on the biomass carbon source, it is preferable in the present invention to dry the biomass carbon source obtained after the catalytic treatment, to obtain the first intermediate product. In the present invention, drying the biomass carbon source after the catalytic treatment is preferably conducted at a temperature of 70° C.~120° C., and more preferably 90° C.~100° C. In the present invention, a moisture content of the first intermediate product is preferably <10 wt %, and more preferably <5 wt %.

In the present invention, after the first intermediate product is obtained, under the condition of a protective gas, the first intermediate product is heated from a first temperature to a second temperature, and kept at the temperature, to obtain a second intermediate product, where the first temperature is 20° C.~40° C., and the second temperature is 300° C.~400° C. In the present invention, heating the first intermediate product from the first temperature to the second temperature is preferably conducted at a heating rate of 5° C./min~20° C./min, and more preferably 10° C./min~15° C./min. In the present invention, the first temperature is preferably 25° C.~35° C., and more preferably 28° C.~32° C. In the present invention, the second temperature is preferably 320° C.~380° C., and more preferably 340° C.~360° C. In the present invention, the time for keeping the second temperature after the first intermediate product is heated from the first temperature to the second temperature is preferably 4 hours to 8 hours, and more preferably 5 hours to 6 hours.

In the present invention, the protective gas is preferably one or more selected from the group consisting of nitrogen gas and inert gases, and more preferably nitrogen gas. In the present invention, a feeding volume of the protective gas is preferably 200 mL/min~800 mL/min, and more preferably 400 mL/min~600 mL/min.

In the present invention, after the second intermediate product is obtained, under the condition of a protective gas, the second intermediate product is heated from the second temperature to a third temperature, and kept at the temperature to obtain a third intermediate product, where the third temperature is 800° C.~900° C. In the present invention, heating the second intermediate product from the second temperature to the third temperature is preferably conducted at a heating rate of 20° C./min~50° C./min, and more preferably 30° C./min~40° C./min. In the present invention, the third temperature is preferably 820° C.~880° C., and more preferably 840° C.~860° C. In the present invention, the time for keeping the third temperature after the second intermediate product is heated from the second temperature to the third temperature is preferably 3.5 hours to 7 hours, and more preferably 5 hours to 6 hours.

In the present invention, the type and the feeding volume of the protective gas are the same as the type and the feeding volume of the protective gas in the above-mentioned technical solution, which will not be repeated here. In the present invention, the protective gas can be the same as or different from the protective gas in the above-mentioned technical solution.

In the present invention, after the third intermediate product is obtained, under the condition of a protective gas, the third intermediate product is heated from the third temperature to a fourth temperature, and kept at the temperature to obtain a fourth intermediate product, where the fourth temperature is 1,100° C.~1,300° C. In the present invention, heating the third intermediate product from the third temperature to the fourth temperature is preferably conducted at a heating rate of 50° C./min~60° C./min, and more preferably 54° C./min~58° C./min. In the present invention, the fourth temperature is preferably 1,150° C.~1,250° C., and more preferably 1,200° C. In the present invention, the time for keeping the fourth temperature after the third intermediate product is heated from the third temperature to the fourth temperature is preferably 6 hours to 8 hours, and more preferably 7 hours.

In the present invention, the type and the feeding volume of the protective gas are same as the types and the feeding volumes of the protective gases in the above-mentioned technical solutions, which will not be repeated here. In the present invention, the protective gas can be the same as or different from the protective gases in the above-mentioned technical solutions.

In the present invention, after the fourth intermediate product is obtained, under the condition of a protective gas, the fourth intermediate product is heated from the fourth temperature to a fifth temperature, and kept at the temperature to obtain the porous graphene, where the fifth temperature is 900° C.~1,000° C. In the present invention, cooling the fourth intermediate product from the fourth temperature to the fifth temperature is preferably conducted at a cooling rate of 30° C./min~50° C./min, and more preferably 35° C./min~45° C./min. In the present invention, the fifth temperature is preferably 920° C.~980° C., and more preferably 940° C.~960° C. In the present invention, the time for keeping the fifth temperature after the fourth intermediate product is cooled from the fourth temperature to the fifth temperature is preferably 2 hours to 4 hours, and more preferably 3 hours.

In the present invention, the type and the feeding volume of the protective gas are same as the types and the feeding volumes of the protective gases in the above-mentioned technical solutions, which will not be repeated here. In the present invention, the protective gas can be the same as or different from the protective gases in the above-mentioned technical solutions.

After keeping the fifth temperature is completed, it is preferable in the present invention to cool down the product obtained after keeping the fifth temperature, to obtain the porous graphene. In the present invention, a temperature after cooling down is preferably <100° C., more preferably 20° C.~60° C., and most preferably 30° C.~40° C. The cooling is preferably carried out under the condition of a protective gas in the present invention. In the present invention, the type and the feeding volume of the protective gas are same as the types and the feeding volumes of the protective gases in the above-mentioned technical solutions, which will not be repeated here. In the present invention, the protective gas can be the same as or be different from the protective gases in the above-mentioned technical solutions. In the present invention, the cooling is preferably implemented by natural cooling.

After the cooling is completed, it is preferable in the present invention to wash the obtained cooled product, to obtain the porous graphene. In the present invention, the method for washing preferably comprises:
  conducting first washing on the cooled product in an alkaline aqueous solution, to obtain a first washed product;
  conducting second washing on the first washed product in an acidic aqueous solution, to obtain a second washed product; and
  conducting third washing on the second washed product in water, to obtain the porous graphene.

In the present invention, it is preferable to conduct the first washing on the cooled product in an alkaline solution, to obtain the first washed product. In the present invention, a mass concentration of the alkaline aqueous solution is preferably 3%~55%, more preferably 10%~40%, and most preferably 20%~30%. In the present invention, the first washing is preferably conducted at a temperature of 60° C.~120° C., and more preferably 80° C.~100° C. In the present invention, the first washing preferably lasts for 4 hours to 24 hours, more preferably 8 hours to 16 hours, and most preferably 10 hours to 14 hours. In the present invention, the alkaline aqueous solution is preferably an aqueous solution of sodium hydroxide or ammonia water.

After the first washed product is obtained, it is preferable in the present invention to conduct the second washing on the first washed product in an acidic aqueous solution, to obtain the second washed product. In the present invention, a mass concentration of the acidic aqueous solution is preferably 4%~10%, and more preferably 6%~8%. In the present invention, the second washing is preferably conducted at a temperature of 70° C.~150° C., and more preferably 90° C.~120° C. In the present invention, the second washing preferably lasts for 4 hours to 24 hours, more preferably 8 hours to 16 hours, and most preferably 10 hours to 14 hours. In the present invention, the acidic aqueous solution is preferably an aqueous hydrochloric acid solution.

After the second washed product is obtained, it is preferable to conduct the third washing on the second washed product in water, to obtain the porous graphene. In the present invention, the water is preferably distilled water. Methods for the third washing are not specially limited in the present invention, as long as neutral porous graphene can be obtained after the third washing.

After the washing is completed, it is preferable in the present invention to dry the obtained washed product, to obtain the porous graphene. Methods for drying the washed product are not specially limited in the present invention, and a drying technical solution well-known to a person skilled in the art can be used.

A transmission electron microscope test was conducted on the graphene prepared in the present invention, and the result of the test showed that, the graphene prepared with the method provided in the present invention has a relatively thin lamellar structure with less than 10 lamellas and it is porous graphene. A Raman spectrum test was conducted on the porous graphene prepared in the present invention, and the result of the test showed that the porous graphene prepared with the method provided in the present invention has a high level of Sp2 hybridization. The electrical conductivity of the porous graphene prepared in the present invention was tested using an electrical conductivity tester, and. the result of the test showed that the electrical conductivity of the porous graphene prepared with the method provided in the present invention can be up to 40,000 S/m.

The present invention provides a method for preparing porous graphene, which comprises the following steps: 1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds; 2) under the condition of a protective gas, heating the first intermediate product from a first temperature to a second temperature, and keeping the second temperature to obtain a second intermediate product, the first temperature being 20° C.~40° C., and the second temperature being 300° C.~400° C.; 3) under the condition of a protective gas, heating the second intermediate product from the second temperature to a third temperature, and keeping the third temperature to obtain a third intermediate product, the third temperature being 800° C.~900° C.; 4) under the condition of a protective gas, heating the third intermediate product from the third temperature to a fourth temperature, and keeping the fourth temperature to obtain a fourth intermediate product, the fourth temperature being 1,100° C.~1,300° C.; and 5) under the condition of a protective gas, cooling the fourth intermediate product from the fourth temperature to a fifth temperature, and keeping the fifth temperature to obtain the porous graphene, the fifth temperature being 900° C.~1,000° C. The porous graphene prepared with the method provided in the present invention has a relatively good electrical conductivity. Besides, the porous graphene prepared with the method provided in the present invention has a thin lamellar structure and a high level of Sp2 hybridization; moreover, the method for preparing porous graphene provided in the present invention has a simple process, low energy consumption and low cost.

Example 1

At 90° C., corncob was hydrolyzed in sulfuric acid for 10 min, to obtain lignocellulose, in which a mass of the sulfuric acid was 3% of a mass of the corncob.

At 70° C., acidic sulfite treatment was conducted on the lignocellulose for 1 hour, to obtain porous cellulose. In the process of the acidic sulfite treatment, a pH value was 1, an acid was sulfuric acid, a sulfite was magnesium sulfite, a mass of the sulfuric acid was 4% of a mass of the lignocellulose, and a liquid-to-solid ratio was 2:1.

Hydrogen peroxide bleaching was conducted on the obtained porous cellulose, in which a mass of hydrogen peroxide was 5% of a mass of the porous cellulose, a bleaching temperature for the hydrogen peroxide bleaching was 100° C., and bleaching time was 5 h.

Example 2

At 180° C., corncob was hydrolyzed in nitric acid for 10 h, to obtain lignocellulose, in which a mass of the nitric acid was 20% of a mass of the corncob.

At 180° C., acidic sulfite treatment was conducted on the lignocellulose for 6 hours, to obtain porous cellulose. In the process of the acidic sulfite treatment, a pH value was 7, an acid was sulfuric acid, a sulfite was sodium sulfite, a mass of the sulfuric acid was 30% of a mass of the lignocellulose, and a liquid-to-solid ratio was 20:1.

Hydrogen peroxide bleaching was conducted on the porous cellulose, in which a mass of hydrogen peroxide was 5% of a mass of the porous cellulose, a bleaching temperature for the hydrogen peroxide bleaching was 100° C., and bleaching time was 5 h.

Example 3

At 130° C., corncob was hydrolyzed in hydrochloric acid for 5 h, to obtain lignocellulose, in which a mass of the hydrochloric acid was 10% of a mass of the corncob.

At 120° C., acidic sulfite treatment was conducted on the lignocellulose for 4 hours, to obtain porous cellulose. In the process of the acidic sulfite treatment, a pH value was 3, an acid was sulfuric acid, a sulfite was ammonium sulfite, a mass of the sulfuric acid was 18% of a mass of the lignocellulose, and a liquid-to-solid ratio was 10:1.

Hydrogen peroxide bleaching was conducted on the porous cellulose, in which a mass of hydrogen peroxide was 5% of a mass of the porous cellulose, a bleaching temperature for the hydrogen peroxide bleaching was 100° C., and bleaching time was 5 h.

Example 4

At 150° C., corncob was hydrolyzed in hydrochloric acid for 1 h, to obtain lignocellulose, in which a mass of the hydrochloric acid was 15% of a mass of the corncob.

At 70° C., alkaline sulfite treatment was conducted on the lignocellulose for 1 hour, to obtain porous cellulose. In the process of the alkaline sulfite treatment, a pH value was 7, a base was sodium hydroxide, a sulfite was magnesium sulfite, a mass of the sodium hydroxide was 4% of a mass of the lignocellulose, and a liquid-to-solid ratio was 2:1.

Hydrogen peroxide bleaching was conducted on the porous cellulose, in which a mass of hydrogen peroxide was 5% of a mass of the porous cellulose, a bleaching temperature for the hydrogen peroxide bleaching was 100° C., and bleaching time was 5 h.

Example 5

At 120° C., corncob was hydrolyzed in hydrochloric acid for 8 h, to obtain lignocellulose, in which a mass of the hydrochloric acid was 8% of a mass of the corncob.

At 180° C., alkaline sulfite treatment was conducted on the lignocellulose for 6 hours, to obtain porous cellulose. In the process of the alkaline sulfite treatment, a pH value was 14, a base was magnesium hydroxide, a sulfite was sodium sulfite, a mass of the magnesium hydroxide was 30% of a mass of the lignocellulose, and a liquid-to-solid ratio was 20:1.

Example 6

The porous cellulose obtained in Example 1 and manganese chloride were stirred for 2 hours at 20° C. for catalytic treatment, in which a mass ratio of the manganese chloride to the porous cellulose was 0.01:1. The product obtained after the catalytic treatment was dried at 70° C., to obtain a first intermediate product with a moisture content lower than 10 wt %.

The first intermediate product was placed into a carbonization furnace, and nitrogen gas was fed as a protective gas into the carbonization furnace at a gas feeding volume of 200 mL/min. The first intermediate product was heated from 25° C. to 300° C. at a rate of 5° C./min, and kept at the temperature for 4 hours, to obtain a second intermediate product. The second intermediate product was heated from 300° C. to 800° C. at a rate of 20° C./min, and kept at the temperature 3.5 hours, to obtain a third intermediate product. The third intermediate product was heated from 800° C. to 1,100° C. at a rate of 50° C./min, and kept at the temperature for 6 hours, to obtain a fourth intermediate product. The fourth intermediate product was cooled from 1,100° C. to 900° C. at a rate of 30° C./min, and kept at the temperature for 2 hours. The fourth intermediate product after the cooling was cooled down to 60° C.

At 60° C., the fourth intermediate product after the cooling down above was washed for 4 hours in an aqueous solution of sodium hydroxide with a mass concentration of 3%, to obtain a first washed product. At 70° C., the first washed product was washed for 4 hours in an aqueous hydrochloric acid solution with a mass concentration of 4%, to obtain a second washed product. The second washed product was washed with distilled water until it was neutral, and then dried, to obtain graphene.

A Raman spectrum test was conducted on the graphene prepared in Example 6 of the present invention, and the result of the test was shown in FIG. 1. FIG. 1 shows Raman spectrum of the graphene obtained in Example 6 of the present invention. As can be seen in FIG. 1, the graphene prepared with the method provided in Example 6 of the present invention has a high level of Sp2 hybridization. A transmission electron microscope test was conducted on the graphene prepared in Example 6 of the present invention, and the results of the test were shown in FIG. 2 to FIG. 5. FIG. 2 to FIG. 5 show transmission electron microscope pictures of the graphene obtained in Example 6 of the present invention. As can be seen from FIG. 2 to FIG. 5, the graphene prepared with the method provided in Example 6 of the present invention has a relatively thin lamellar structure with less than 10 lamellas, and it is porous graphene. The electrical conductivity of the porous graphene prepared in Example 6 of the present invention was tested using an electrical conductivity tester, and the results of the test showed that the electrical conductivity of the porous graphene prepared with the method provided in Example 6 of the present invention is 40,000 S/m.

Example 7

The porous cellulose prepared in Example 2 and ferric nitrate were stirred for 10 hours at 180° C. for catalytic treatment, in which a mass ratio of the ferric nitrate to the porous cellulose was 2:1. The product obtained after the catalytic treatment was dried at 120° C., to obtain a first intermediate product with a moisture content lower than 5 wt %.

The first intermediate product was placed into a carbonization furnace, and argon gas was fed as a protective gas into the carbonization furnace at a gas feeding volume of 800 mL/min. The first intermediate product was heated from 20° C. to 400° C. at a rate of 20° C./min, and kept at the temperature for 8 hours, to obtain a second intermediate product. The second intermediate product was heated from 400° C. to 900° C. at a rate of 50° C./min, and kept at the temperature for 7 hours, to obtain a third intermediate product. The third intermediate product was heated from 900° C. to 1,300° C. at a rate of 60° C./min, and kept at the temperature for 8 hours, to obtain a fourth intermediate product. The fourth intermediate product was cooled from 1,300° C. to 1,000° C. at a rate of 50° C./min, and kept at the temperature for 4 hours. The fourth intermediate product after the cooling was cooled down to 20° C.

At 120° C., the fourth intermediate product after the cooling down above was washed for 24 hours in an aqueous solution of sodium hydroxide with a mass concentration of 55%, to obtain a first washed product. At 150° C., the first washed product was washed for 24 hours in an aqueous hydrochloric acid solution with a mass concentration of 10%, to obtain a second washed product. The second washed product was washed with distilled water until it was neutral, and then dried, to obtain graphene.

According to the methods described in Example 6, the graphene obtained in Example 7 of the present invention was tested. Results of the tests showed that, the graphene prepared with the method provided in Example 7 of the present invention has a high level of Sp2 hybridization; the graphene has a relatively thin lamellar structure with less than 10 lamellas, and it is porous graphene; and the electrical conductivity of the porous graphene is 38,000 S/m.

Example 8

The porous cellulose prepared in Example 3 and cobalt sulfate were stirred for 5 hours at 50° C. for catalytic treatment, in which a mass ratio of the cobalt sulfate to the porous cellulose was 0.1:1. The product obtained after the catalytic treatment was dried at 90° C., to obtain a first intermediate product with a moisture content lower than 8 wt %.

The first intermediate product was placed into a carbonization furnace, and nitrogen gas was fed as a protective gas into the carbonization furnace at a gas feeding volume of 400 mL/min. The first intermediate product was heated from 40° C. to 320° C. at a rate of 10° C./min, and kept at the temperature for 5 hours, to obtain a second intermediate product. The second intermediate product was heated from 320° C. to 820° C. at a rate of 30° C./min, and kept at the temperature for 5 hours, to obtain a third intermediate product. The third intermediate product was heated from 820° C. to 1,150° C. at a rate of 54° C./min, and kept at the temperature for 7 hours, to obtain a fourth intermediate product. The fourth intermediate product was cooled from 1,150° C. to 920° C. at a rate of 35° C./min, and kept at the temperature for 3 hours. The fourth intermediate product after the cooling was cooled down to 30° C.

At 80° C., the fourth intermediate product after the cooling down above was washed for 8 hours in ammonia water with a mass concentration of 10%, to obtain a first washed product. At 90° C., the first washed product was washed for 8 hours in an aqueous hydrochloric acid solution with a mass concentration of 6%, to obtain a second washed product. The second washed product was washed with distilled water until it was neutral, and then dried, to obtain graphene.

According to the methods described in Example 6, the graphene obtained in Example 8 of the present invention was tested. Results of the tests showed that, the graphene prepared with the method provided in Example 8 of the present invention has a high level of Sp2 hybridization; the graphene has a relatively thin lamellar structure with less than 10 lamellas, and it is porous graphene; and the electrical conductivity of the porous graphene is 39,000 S/m.

Example 9

The porous cellulose prepared in Example 4 and nickel acetate were stirred for 7 hours at 150° C. for catalytic treatment, in which a mass ratio of the nickel acetate to the porous cellulose was 1:1. The product obtained after the catalytic treatment was dried at 100° C., to obtain a first intermediate product with a moisture content lower than 3 wt %.

The first intermediate product was placed into a carbonization furnace, and nitrogen gas was fed as a protective gas into the carbonization furnace at a gas feeding volume of 600 mL/min. The first intermediate product was heated from 28° C. to 380° C. at a rate of 15° C./min, and kept at the temperature for 6 hours, to obtain a second intermediate product. The second intermediate product was heated from 380° C. to 880° C. at a rate of 40° C./min, and kept at the temperature for 6 hours, to obtain a third intermediate product. The third intermediate product was heated from 880° C. to 1,250° C. at a rate of 58° C./min, and kept at the temperature for 6.5 hours, to obtain a fourth intermediate product. The fourth intermediate product was cooled from 1,250° C. to 980° C. at a rate of 45° C./min, and kept at the temperature for 2.5 hours. The fourth intermediate product after the cooling was cooled down to 40° C.

At 100° C., the fourth intermediate product after the cooling down above was washed for 16 hours in an aqueous solution of sodium hydroxide with a mass concentration of 40%, to obtain a first washed product. At 120° C., the first washed product was washed for 16 hours in an aqueous hydrochloric acid solution with a mass concentration of 8%, to obtain a second washed product. The second washed product was washed with distilled water until it was neutral, and then dried, to obtain graphene.

According to the methods described in Example 6, the graphene obtained in Example 9 of the present invention was tested. Results of the tests showed that, the graphene prepared with the method provided in Example 9 of the present invention has a high level of Sp2 hybridization; the graphene has a relatively thin lamellar structure with less than 10 lamellas, and it is porous graphene; and the electrical conductivity of the porous graphene is 38,500 S/m.

Example 10

The porous cellulose prepared in Example 5, potassium ferricyanide and cobalt acetate were stirred for 6 hours at 80° C. for catalytic treatment, in which a mass ratio of a total mass of the potassium ferricyanide and the cobalt acetate to the porous cellulose was 0.3:1. The product obtained after the catalytic treatment was dried at 95° C., to obtain a first intermediate product with a moisture content lower than 6 wt %.

The first intermediate product was placed into a carbonization furnace, and nitrogen gas was fed as a protective gas into the carbonization furnace at a gas feeding volume of 500 mL/min. The first intermediate product was heated from 35° C. to 340° C. at a rate of 12° C./min, and kept at the temperature for 7 hours, to obtain a second intermediate product. The second intermediate product was heated from 340° C. to 840° C. at a rate of 35° C./min, and kept at the temperature for 4 hours, to obtain a third intermediate product. The third intermediate product was heated from 840° C. to 1,200° C. at a rate of 55° C./min, and kept at the temperature for 7.5 hours, to obtain a fourth intermediate product. The fourth intermediate product was cooled from 1,200° C. to 940° C. at a rate of 40° C./min, and kept at the temperature was maintained for 3.5 hours. The fourth intermediate product after the cooling was cooled down to 50° C.

At 90° C., the fourth intermediate product after the cooling down above was washed for 10 hours in an aqueous solution of sodium hydroxide with a mass concentration of 20%, to obtain a first washed product. At 100° C., the first washed product was washed for 10 hours in an aqueous hydrochloric acid solution with a mass concentration of 7%, to obtain a second washed product. The second washed product was washed with distilled water until it was neutral, and then dried, to obtain graphene.

According to the methods described in Example 6, the graphene obtained in Example 10 of the present invention was tested. Results of the tests showed that, the graphene prepared with the method provided in Example 10 of the present invention has a high level of Sp2 hybridization; the graphene has a relatively thin lamellar structure with less than 10 lamellas, and it is porous graphene; and the electrical conductivity of the porous graphene is 37,000 S/m.

Comparison Example 1

Graphene was prepared with the method disclosed in Chinese patent application no. 200810113596.0, and the specific process thereof was as follows:

a silicon substrate was washed with deionized water, ethanol, and acetone in sequence, and then dried; and a layer of zinc sulfide having a thickness of 100 nanometers was deposited as a catalyst on a surface of the silicon substrate through a vapor deposition technique;

the silicon substrate deposited with the zinc sulfide was placed in the middle of a clean quartz tube, and the quartz tube was placed in an electric furnace with the middle of the quartz tube located in a central area of the electric furnace; and then, heating was started after a mixed gas of hydrogen gas of 100 sccm and argon gas of 100 sccm was fed into the quartz tube for 60 minutes;

when a temperature in the central area of the electric furnace was up to 850° C., ethanol was fed as a carbon source into the electric furnace, and reaction started;

after the reaction have been carried out for 20 minutes, the feeding of ethanol was stopped and the electric furnace was turned off, the feeding of the mixed gas of hydrogen gas of 100 sccm and argon gas of 100 sccm was continued until the temperature was decreased to room temperature, to obtain a substrate deposited with graphene; and the substrate deposited with the graphene was placed in 0.1 mol/L hydrochloric acid solution to be soaked for 60 minutes, to remove zinc sulfide, and then washed with deionized water and dried, to obtain the graphene.

The electrical conductivity of the graphene prepared in Comparison Example 1 of the present invention was tested using an electrical conductivity tester, and the result of the test showed that the electrical conductivity of the graphene prepared with the method provided in Comparison Example 1 of the present invention was 30,000 S/m.

As can be seen from the examples above, the present invention provides a method for preparing porous graphene, which comprises the following steps: 1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds; 2) under the condition of a protective gas, heating the first intermediate product from a first temperature to a second temperature, and keeping the second temperature to obtain a second intermediate product, the first temperature being 20° C.~40° C., and the second temperature being 300° C.~400° C.; 3) under the condition of a protective gas, heating the second intermediate product from the second temperature to a third temperature, and keeping the third temperature to obtain a third intermediate product, the third temperature being 800° C.~900° C.; 4) under the condition of a protective gas, heating the third intermediate product from the third temperature to a fourth temperature, and keeping the fourth temperature to obtain a fourth intermediate product, the fourth temperature being 1,100° C.~1,300° C.; and 5) under the condition of a protective gas, cooling the fourth intermediate product from the fourth temperature to a fifth temperature, and keeping the fifth temperature to obtain the porous graphene, the fifth temperature being 900° C.~1,000° C. The porous graphene prepared with the method provided in the present invention has a relatively good electrical conductivity. Besides, the porous graphene prepared with the method provided in the present invention has a thin lamellar structure and a high level of Sp2 hybridization; moreover, the method for preparing porous graphene provided in the present invention has a simple process, low energy consumption and low cost.

The invention claimed is:
1. A method for preparing porous graphene, comprising steps of:
   1) in the presence of a catalyst, conducting catalytic treatment on a biomass carbon source, to obtain a first intermediate product, the catalyst comprising one or more selected from the group consisting of chlorides of manganese, iron compounds, cobalt compounds and nickel compounds;
   2) under a condition of a protective gas, heating the first intermediate product from a first temperature to a second temperature, and keeping the second temperature to obtain a second intermediate product, the first temperature being 20° C.~40° C., and the second temperature being 300° C.~400° C.;
   3) under a condition of a protective gas, heating the second intermediate product from the second temperature to a third temperature, and keeping the third temperature to obtain a third intermediate product, the third temperature being 800° C.~900° C.;
   4) under a condition of a protective gas, heating the third intermediate product from the third temperature to a fourth temperature, and keeping the fourth temperature to obtain a fourth intermediate product, the fourth temperature being 1,100° C.~1,300° C.; and
   5) under a condition of a protective gas, cooling the fourth intermediate product from the fourth temperature to a fifth temperature, and keeping the fifth temperature to obtain the porous graphene, the fifth temperature being 900° C.~1,000° C.

2. The method according to claim 1, wherein the biomass carbon source in the step 1) is one or two selected from the group consisting of cellulose and lignin.

3. The method according to claim 2, wherein the biomass carbon source in the step 1) is cellulose.

4. The method according to claim 3, wherein the cellulose is porous cellulose.

5. The method according to claim 4, wherein the porous cellulose is prepared by a method comprising steps of:
   A) hydrolyzing a biomass resource in an acid, to obtain lignocellulose, the biomass resource comprising one or more selected from the group consisting of plants and agricultural and forestry residues; and
   B) conducting treatment on the lignocellulose, to obtain the porous cellulose, the treatment comprising acid treatment, salt treatment or organic solvent treatment.

6. The method according to claim 5, wherein the biomass resource in the step A) is the agricultural and forestry residue.

7. The method according to claim 6, wherein the agricultural and forestry residue comprises one or more selected from the group consisting of corn stalk, corncob, sorghum stalk, beet pulp, bagasse, furfural residue, corncob residue, wood chip, cotton stalk and reed.

8. The method according to claim 7, wherein the agricultural and forestry residue is corncob.

9. The method according to claim 5, wherein the acid in the step A) comprises one or more selected from the group consisting of sulfuric acid, nitric acid, hydrochloric acid, formic acid, sulfurous acid, phosphoric acid and acetic acid.

10. The method according to claim 5, wherein a dosage of the acid in the step A) is 3 wt %~20 wt % of the biomass resource.

11. The method according to claim 5, wherein the hydrolyzing in the step A) is conducted at a temperature of 90° C.~180° C.; and
   the hydrolyzing in the step A) lasts for 10 min~10 h.

12. The method according to claim 5, wherein the salt treatment in the step B) is acidic sulfite treatment or alkaline sulfite treatment.

13. The method according to claim 12, wherein a pH value in a process of the acidic sulfite treatment is 1~7;
   a dosage of an acid in the process of the acidic sulfite treatment is 4 wt %~30 wt % of the lignocellulose; and
   a percentage by weight of the acid in the acidic sulfite treatment causes a liquid-to-solid ratio of (2~20):1.

14. The method according to claim 12, wherein the acidic sulfite treatment is conducted at a temperature of 70° C.~180° C.; and
   the acidic sulfite treatment lasts for 1 hour to 6 hours.

15. The method according to claim 12, wherein a pH value in a process of the alkaline sulfite treatment is 7~14;
   a dosage of a base in the process of the alkaline sulfite treatment is 4 wt %~30 wt % of the lignocellulose; and
   a percentage by weight of the base in the alkaline sulfite treatment causes a liquid-to-solid ratio of (2~20):1.

16. The method according to claim 12, wherein the alkaline sulfite treatment is conducted at a temperature of 70° C.~180° C.; and
   the alkaline sulfite treatment lasts for 1 hour to 6 hours.

17. The method according to claim 5, wherein after the porous cellulose is obtained, the step B) further comprises:
   conducting bleaching treatment on the porous cellulose.

18. The method according to claim 1, wherein a mass ratio of the catalyst to the biomass carbon source in the step 1) is (0.01~2):1.

19. The method according to claim 1, wherein the iron compounds in the step 1) comprise one or more selected from the group consisting of chlorides of iron, cyanides of iron and salts of iron-containing acids;
   the cobalt compounds in the step 1) comprise one or more selected from the group consisting of chlorides of cobalt and salts of cobalt-containing acids; and
   the nickel compounds in the step 1) comprise one or more selected from the group consisting of chlorides of nickel and salts of nickel-containing acids.

20. The method according to claim 1, wherein the catalyst in the step 1) comprises one or more selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

21. The method according to claim 1, wherein the protective gas in the step 2), the protective gas in the step 3), the protective gas in the step 4) and the protective gas in the step 5) are independently one or more selected from the group consisting of nitrogen gas and inert gases.

22. The method according to claim 1, wherein heating the first intermediate product from the first temperature to the second temperature in the step 2) is conducted at a heating rate of 5° C./min~20° C./min.

23. The method according to claim 1, wherein heating the second intermediate product from the second temperature to the third temperature in the step 3) is conducted at a heating rate of 30° C./min~40° C./min.

24. The method according to claim 1, wherein heating the third intermediate product from the third temperature to the fourth temperature in the step 4) is conducted at a heating rate of 50° C./min~60° C./min.

25. The method according to claim 1, wherein cooling the fourth intermediate product from the fourth temperature to the fifth temperature in the step 5) is conducted at a cooling rate of 30° C./min~50° C./min.

* * * * *